(12) United States Patent  
Hyakudai et al.

(10) Patent No.: US 12,284,138 B2  
(45) Date of Patent: Apr. 22, 2025

(54) COMMUNICATION APPARATUS, COMMUNICATION SYSTEM, AND COMMUNICATION METHOD

(71) Applicant: Sony Semiconductor Solutions Corporation, Kanagawa (JP)

(72) Inventors: Toshihisa Hyakudai, San Diego, CA (US); Hiroo Takahashi, Kanagawa (JP); Junya Yamada, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 213 days.

(21) Appl. No.: 17/800,677

(22) PCT Filed: Mar. 4, 2021

(86) PCT No.: PCT/JP2021/008476  
§ 371 (c)(1),  
(2) Date: Aug. 18, 2022

(87) PCT Pub. No.: WO2021/187141  
PCT Pub. Date: Sep. 23, 2021

(65) Prior Publication Data  
US 2023/0254100 A1 Aug. 10, 2023

Related U.S. Application Data

(63) Continuation of application No. 16/820,377, filed on Mar. 16, 2020, now Pat. No. 12,095,709.

(51) Int. Cl.  
*H04L 5/14* (2006.01)  
*H04L 5/22* (2006.01)

(52) U.S. Cl.  
CPC . *H04L 5/14* (2013.01); *H04L 5/22* (2013.01)

(58) Field of Classification Search  
CPC .................................. H04L 5/14; H04L 5/22  
See application file for complete search history.

(56) References Cited

U.S. PATENT DOCUMENTS 9,173,227 B2    10/2015   Lv  
9,923,690 B2 *   3/2018   Ekpenyong ........... H04L 5/1438  
(Continued)

FOREIGN PATENT DOCUMENTS

JP      2013034153 A     2/2013  
JP      2015-053565 A    3/2015  
(Continued)

OTHER PUBLICATIONS

International Search Report (PCT/ISA/210), International Application No. PCT/JP2021/008476, dated May 18, 2021.

(Continued)

*Primary Examiner* — Bailor C Hsu  
(74) *Attorney, Agent, or Firm* — Michael Best & Friedrich LLP

(57) ABSTRACT

A communication apparatus includes: a communication unit that performs signal transmission to and from a communication partner apparatus; and a communication control unit that changes a signal ratio in a first direction to the communication partner apparatus and a signal ratio in a second direction from the communication partner apparatus in accordance with a signal transmission state with the communication partner apparatus.

23 Claims, 13 Drawing Sheets

(56) References Cited

U.S. PATENT DOCUMENTS

| | | | |
|---|---|---|---|
| 10,153,917 | B1 | 12/2018 | Tonietto |
| 10,348,394 | B1 | 7/2019 | Bakr |
| 10,348,482 | B1 | 7/2019 | Simpson |
| 10,374,608 | B1 | 8/2019 | Ross |
| 10,652,915 | B1* | 5/2020 | Mansour .................. H04L 5/14 |
| 11,902,162 | B2* | 2/2024 | Ota ........................ H04L 47/16 |
| 2007/0109989 | A1 | 5/2007 | Nakagawa |
| 2009/0137251 | A1 | 5/2009 | Ji |
| 2009/0201838 | A1 | 8/2009 | Zhang et al. |
| 2011/0038286 | A1 | 2/2011 | Ta |
| 2011/0149982 | A1 | 6/2011 | Hwang |
| 2012/0063373 | A1 | 3/2012 | Chincholi et al. |
| 2013/0058265 | A1 | 3/2013 | Chini |
| 2013/0301490 | A1 | 11/2013 | He |
| 2014/0043485 | A1 | 2/2014 | Bateman |
| 2014/0334352 | A1 | 11/2014 | Hu |
| 2014/0362701 | A1* | 12/2014 | Roh .................... H03M 13/611 |
| | | | 370/235 |
| 2015/0043396 | A1* | 2/2015 | Ekpenyong ........... H04L 5/0053 |
| | | | 370/280 |
| 2015/0103702 | A1 | 4/2015 | Lahetkangas |
| 2015/0110011 | A1 | 4/2015 | Wei |
| 2015/0350927 | A1 | 12/2015 | Dahiya |
| 2016/0119931 | A1 | 4/2016 | Soriaga |
| 2016/0165275 | A1 | 6/2016 | Yamashita |
| 2017/0220517 | A1 | 8/2017 | Khan |
| 2017/0310396 | A1 | 10/2017 | Yoshizawa |
| 2018/0090080 | A1 | 3/2018 | Chen |
| 2020/0076629 | A1 | 3/2020 | Pandey |
| 2020/0099501 | A1* | 3/2020 | Jia .............................. H04L 5/14 |
| 2020/0314840 | A1 | 10/2020 | Golitschek Edler Von Elbwart |
| 2021/0288781 | A1* | 9/2021 | Hyakudai .......... H04N 7/17309 |
| 2021/0377939 | A1* | 12/2021 | Chae ..................... H04L 5/1469 |

FOREIGN PATENT DOCUMENTS

| | | |
|---|---|---|
| JP | 2016-144085 A | 8/2016 |
| JP | 2017-139670 A | 8/2017 |
| WO | 2005/018161 A1 | 2/2005 |
| WO | WO-2018144642 A1 | 8/2018 |

OTHER PUBLICATIONS

M. Sauerwald, "FPD-Link III—doing more with less," Texas Instruments AAJ 3Q 2014, pp. 1-5 URL : https://www.ti.com/jp/lit/ds/symlink/ds80ub933-ql.pdf ts=1620222065632&ref_url=https%253A%252F%252Fwww.google.com%252F>.

https://www.sony-semicon.co.jp/products/lsi/gvif/technology.htm.

Anonymous: "DS90UB933-Q1—Link III 1 MP/60fps 10/12 100MHz,", Texas Instruments, Nov. 1, 2019 (Nov. 1, 2019), pp. 1-50, XP055859054.

Anonymous: Wikipedia, "FPD-Link",, Nov. 15, 2015 (Nov. 15, 2015), XP055481424.

Rysavy Research: "Global 5G: Implications of a Transformational Technology", 5G Americas' White Paper, 5G Americas, US, Sep. 1, 2019 (Sep. 1, 2019), pp. 1-253, XP009528796.

Japanese Office Action issued Feb. 21, 2025 for corresponding Japanese Application No. 2022-508204.

* cited by examiner

COMMUNICATION APPARATUS, COMMUNICATION SYSTEM, AND COMMUNICATION METHOD

CROSS REFERENCE TO RELATED APPLICATIONS

This application claims the benefit of Japanese Priority Patent Application JP 16/820377 filed on Mar. 16, 2020, the entire contents of which are incorporated herein by reference.

TECHNICAL FIELD

The present disclosure relates to a communication apparatus, a communication system, and a communication method.

BACKGROUND ART

A technology to transmit a large amount of data bi-directionally at high speed with a single cable has been proposed. In the conventional high-speed transmission technology, a frequency division duplexing (FDD) system is often used. In a case where bi-directional signal transmission is performed by the FDD system between a master apparatus and a slave apparatus, a downlink signal transmitting a signal from the master apparatus to the slave apparatus and an uplink signal transmitting a signal from the slave apparatus to the master apparatus use different frequency bands. In the FDD system, bi-directional signals can be transmitted at the same timing. A signal having a larger transmission capacity requires a wider frequency band. Hence, it is common to transmit a signal having a larger transmission capacity using a wider frequency band on the high frequency side, and to transmit a signal having a smaller transmission capacity using a narrower frequency band on the low frequency side.

It is necessary to completely separate the uplink and downlink signals in the reception units that the master apparatus and the slave apparatus respectively have, but it is not preferable to secure a wide frequency band not used for signal transmission between the frequency bands used by the signals in each direction, because the frequency utilization efficiency is deteriorated.

Therefore, it is conceivable to partially overlap the frequency bands in each direction. In this case, since the overlapping frequency regions become interference factors, an echo cancellation circuit performs processing to separate the signals.

CITATION LIST

Non Patent Literature

[NPL 1] http://www.ti.com/lit/an/slyt581/slyt581.pdf
[NPL 2] https://www.sony-semicon.co.jp/products/lsi/gvif/technology.html

SUMMARY

Technical Problem

However, the echo cancellation circuit has a problem that the circuit scale is large and the power consumption is high. The present disclosure provides a communication apparatus, a communication system, and a communication method capable of efficiently transmitting a bi-directional signal with low power consumption.

Solution to Problem

A communication apparatus according to the present disclosure includes:
  a communication unit that performs signal transmission to and from a communication partner apparatus; and
  a communication control unit that changes a signal ratio in a first direction to the communication partner apparatus and a signal ratio in a second direction from the communication partner apparatus in accordance with a signal transmission state with the communication partner apparatus.

The signal transmission state may include at least one of a state in which initialization, security authentication, and key exchange of the communication partner apparatus are performed, a state in which the communication partner apparatus transmits a signal after the initialization, security authentication, and key exchange of the communication partner apparatus have ended, or a state in which signal transmission to and from the communication partner apparatus is stopped.

The signal transmission state may include at least a state in which power activation of at least one of the communication partner apparatus or the communication apparatus or reset of at least one of the communication partner apparatus or the communication apparatus is performed, a state in which initialization, security authentication, and key exchange of the communication partner apparatus are performed, a state in which a signal is transmitted to the communication partner apparatus after initialization, security authentication, and key exchange of the communication partner apparatus have ended, and a state in which signal transmission to and from the communication partner apparatus is stopped. The communication unit may perform signal transmission in the first direction and signal transmission in the second direction in a switching manner in units of predetermined fixed period by time-dividing the fixed period.

The communication control unit may adjust the signal ratios in the first direction and the second direction for each of the fixed periods.

The communication control unit may select one of a plurality of signal ratio patterns representing the type of signal ratios in the first direction and the second direction in accordance with the signal transmission state, and
  the communication unit may perform signal transmission in the first direction and the second direction in a switching manner by time division on the basis of the signal ratio pattern selected by the communication control unit.

A storage unit storing the plurality of signal ratio patterns may be further included,
  in accordance with the signal transmission state, the communication control unit may select one of the plurality of signal ratio patterns stored in the storage unit, and
  the communication unit may transmit a signal indicating the signal ratio pattern selected by the communication control unit to the communication partner apparatus.

The communication unit may transmit and receive a signal having a predetermined frame structure, and
  the frame structure may include information indicating whether or not to permit change of a count value defining timing of changing the signal ratios in the second direction and the first direction, information indicating the count value, the signal ratio pattern being selected, the signal ratio pattern to be selected next, and information indicating whether or not to permit change of a signal ratio.

The frame structure may be included in an operation administration and maintenance (OAM).

In a case of changing the signal ratios in the first direction and the second direction, the communication control unit may change the signal ratios in the first direction and the second direction after a period n times (n is an integer equal to or greater than 2) as long as the fixed period has elapsed.

The communication control unit may change the signal ratios in the first direction and the second direction only in a case where a response indicating that change of a signal ratio pattern is accepted is received from the communication partner apparatus within the period n times as long as the fixed period.

The communication unit may transmit and receive a signal having a frame structure including one or more containers storing the transmitted and received signal for each of the fixed periods, and
   the communication control unit may adjust the number of the containers in accordance with the signal transmission state.

The frame structure may include a synchronization signal, at least one of the containers transmitted and received within the fixed period, and a parity signal.

The communication control unit may make the signal ratio in the first direction and the signal ratio in the second direction 1:1 in at least one of when the communication apparatus and the communication partner apparatus perform security authentication and key exchange, when the communication apparatus performs initialization, or when the communication partner apparatus performs initialization.

The signal ratio may be a ratio of a signal amount or a usage ratio of a signal.

The communication unit may be capable of transmitting a captured video signal, and
   the communication control unit may make the signal ratio in the second direction within a period of receiving a video signal from the communication partner apparatus higher than the signal ratio in the first direction.

The communication unit may receive a video signal transmitted from the communication partner apparatus in units of video frame, and
   the communication control unit may make the signal ratio in the second direction within a period of receiving a video signal in one video frame higher than the signal ratio in the second direction within a vertical blanking period after receiving a video signal in one video frame.

The communication unit may transmit a video signal to the communication partner apparatus in units of video frame, and
   the communication control unit may stop signal transmission in the first direction and the second direction within a vertical blanking period after transmitting a video signal in one video frame.

The communication unit may be capable of transmitting a video signal to be displayed on a display unit of the communication partner apparatus or to be processed by a processing unit of the communication partner apparatus, and
   the communication control unit may make the signal ratio in the second direction within a period of transmitting a video signal to the communication partner apparatus higher than the signal ratio in the first direction.

The communication partner apparatus may be a slave apparatus that performs signal transmission to and from the communication unit on the basis of an instruction from the communication control unit.

The communication partner apparatus may be a master apparatus performing signal transmission to and from the communication unit on the basis of an instruction from the communication control unit.

A communication system according to the present disclosure includes:
   a master apparatus; and
   a slave apparatus that performs signal transmission to and from the master apparatus in accordance with an instruction from the master apparatus, in which the master apparatus and the slave apparatus change a signal ratio in a first direction from the master apparatus to the slave apparatus and a signal ratio in a second direction from the slave apparatus to the master apparatus in accordance with a signal transmission state between the master apparatus and the slave apparatus.

A communication method according to the present disclosure includes
   performing signal transmission between the master apparatus and the slave apparatus in accordance with an instruction from the master apparatus, in which
   the master apparatus and the slave apparatus change a signal ratio in a first direction from the master apparatus to the slave apparatus and a signal ratio in a second direction from the slave apparatus to the master apparatus in accordance with a signal transmission state between the master apparatus and the slave apparatus.

DESCRIPTION OF EMBODIMENTS

Embodiments of a communication apparatus and a communication system will be described below with reference to the drawings. Although the main components of the communication apparatus and the communication system will be mainly described below, the communication apparatus and communication system can have components and functions that are not shown or described. The following description does not exclude components or functions that are not shown or described.

First Embodiment

Figure 1:
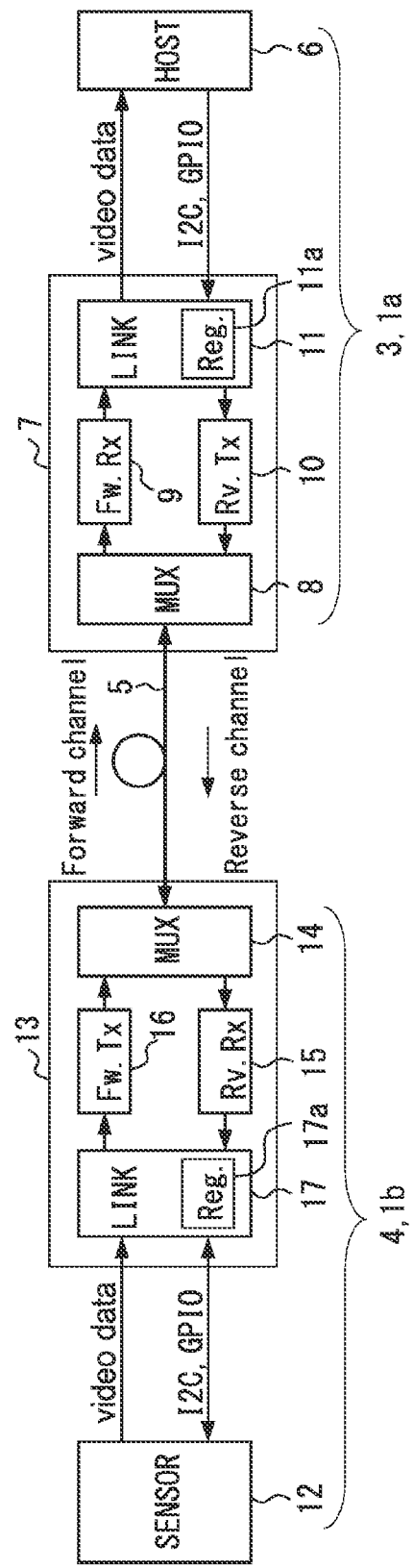
FIG. 1 is a block diagram showing a schematic configuration of a communication system including a communication apparatus according to a first embodiment.

FIG. 1 is a block diagram showing a schematic configuration of a communication system 2 including a communication apparatuses 1a and 1b according to the first embodiment. The communication system 2 of FIG. 1 includes a master apparatus 3 and a slave apparatus 4.

In this description, the master apparatus 3 and the slave apparatus 4 are sometimes referred to as the communication apparatuses 1a and 1b, respectively. In FIG. 1, the flow of a signal when a video signal is transmitted from the slave apparatus 4 to the master apparatus 3 is shown by an arrow. As will be described later, the communication system 2 of FIG. 1 may transmit a video signal from the master apparatus 3 to the slave apparatus 4.

The master apparatus 3 and the slave apparatus 4 of FIG. 1 are connected by a single cable 5, and a signal is transmitted bi-directionally via the cable 5. More specifically, the master apparatus 3 and the slave apparatus 4 transmit a signal bi-directionally in a time division duplexing (TDD) system. In FIG. 1, signal transmission from the master apparatus 3 to the slave apparatus 4 is referred to as a reverse channel, and signal transmission from the slave apparatus 4 to the master apparatus 3 is referred to as a forward channel.

The master apparatus 3 has a host unit 6 and a master SerDes unit 7. The host unit 6 transmits to the master SerDes unit 7 a transmission signal that should be transmitted to the slave apparatus 4. In addition, the host unit 6 transmits and receives a control signal to and from the master SerDes unit 7. The transmission and reception of a control signal between the host unit 6 and the master SerDes unit 7 are performed by inter-integrated circuit (I2C) communication or general purpose input/output (GPIO), for example.

The master SerDes unit 7 converts a parallel signal transmitted from the host unit 6 into a serial signal and transmits it to the slave apparatus 4 via the cable 5.

In addition, the master SerDes unit 7 receives a serial signal transmitted from the slave apparatus 4 via the cable 5, converts the serial signal into a parallel signal, and transmits the parallel signal to the host unit 6. Thus, the master SerDes unit 7 functions as a communication unit that performs signal transmission to and from the slave apparatus 4, which is a communication partner apparatus.

The master SerDes unit 7 has a first MUX unit 8, a first reception unit (Fw. Rx) 9, a first transmission unit (Rv. Tx) 10, and a first LINK unit 11.

The first MUX unit 8 switches between a serial signal from the slave apparatus 4 received via the cable 5 and a serial signal output from a first transmission unit 10 in accordance with time distribution in a TDD cycle.

The first reception unit 9 receives a serial signal (or multi-value signal) transmitted from a slave SerDes unit 13 via the cable 5, performs equalization processing and error detection or error correction processing as necessary, then converts the signal into a parallel signal, and returns the parallel signal to an original frame structure (see FIG. 7, described later). The first transmission unit 10 converts a parallel signal having the frame structure of FIG. 7, which will be described later, into a serial signal or, in a case of a multi-value signal such as PAM4, modulates the signal, and supplies it to the first MUX unit 8.

The first LINK unit 11 performs, in a switching manner in accordance with time, processing of transmitting to the first transmission unit 10 a transmission signal output from the host unit 6 and processing of transmitting to the host unit 6 a decoded signal output from the first reception unit 9.

The slave apparatus 4 has a sensor 12 and the slave SerDes unit 13. The sensor 12 has one or more sensors. For example, the sensor 12 includes an image sensor that outputs a captured video signal, for example. The sensor 12 outputs a parallel signal including a video signal and the like. In addition, the sensor 12 transmits and receives a control signal to and from the slave SerDes unit 13. The transmission and reception of the control signal between the sensor 12 and the slave SerDes unit 13 are performed by I2C communication or GPIO, for example.

The slave SerDes unit 13 has a second MUX unit 14, a second reception unit (Rv. Rx) 15, a second transmission unit (Fw. Tx) 16, and a second LINK unit 17.

The second MUX unit 14 switches between a serial signal from the master apparatus 3 received via the cable 5 and a serial signal output from a second transmission unit 16 in accordance with time distribution in a TDD cycle.

The second reception unit 15 receives a serial signal (or multi-value signal) transmitted from the master SerDes unit 7 via the cable 5, performs equalization processing and error detection or error correction processing as necessary, then converts the signal into a parallel signal, and returns the parallel signal to the frame structure of FIG. 7, described later. The second transmission unit 16 converts a parallel signal having the frame structure of FIG. 7, which will be described later, into a serial signal or, in a case of a multi-value signal such as PAM4, modulates the signal, and supplies it to the second MUX unit 14.

The second LINK unit 17 performs, in a switching manner in accordance with time, processing of transmitting to the second transmission unit 16 a parallel signal output from the sensor 12 and processing of transmitting to the sensor 12 a decoded signal output from the second reception unit 15.

The host unit 6 functions as a communication control unit controlling the master SerDes unit 7. More specifically, the host unit 6 can change the signal ratio in the downlink direction (first direction) to the slave apparatus 4 and the signal ratio in the uplink direction (second direction) from the slave apparatus 4 in accordance with the signal transmission state with the slave apparatus 4. The signal ratio changed by the host unit 6 is sent to the master SerDes unit 7. The master SerDes unit 7 stores its own signal ratio into a storage unit 11a and transmits a signal including the signal ratio of the slave apparatus 4 to the slave apparatus 4 via the cable 5. The slave apparatus 4 stores the received signal ratio into a storage unit 17a in the slave SerDes unit 13, for example. The storage units 11a and 17a can be configured by, for example, a register or a semiconductor memory.

Here, the signal ratio refers mainly to a ratio of a signal amount, but it can also refer to a usage ratio of a signal in some cases. In addition, the signal transmission state may include at least one of a state in which initialization, security authentication, and key exchange of the communication partner apparatus (for example, the slave apparatus 4) are performed, a state in which the communication partner apparatus transmits a signal after the initialization, security authentication, and key exchange of the communication partner apparatus have ended, or a state in which signal transmission to and from the communication partner apparatus is stopped.

Alternatively, the signal transmission state may include at least one of a state in which power activation or reset of the communication partner apparatus (for example, the slave apparatus 4) is performed, a state in which initialization, security authentication, and key exchange of the communication partner apparatus are performed, a state in which a signal is transmitted to the communication partner apparatus after initialization, security authentication, and key exchange of the communication partner apparatus have ended, or a state in which signal transmission to and from the communication partner apparatus is stopped.

It is to be noted that the control of the signal ratio between the master apparatus 3 and the slave apparatus 4 may be performed by the slave apparatus 4 instead of the master apparatus 3. In this case, the communication control unit is provided in the slave apparatus 4. An example in which the host unit 6 in the master apparatus 3 functions as a communication control unit will be mainly described below.

In a case of changing the downlink and uplink signal ratios when switching between the signal ratios of the master apparatus 3 and the slave apparatus 4, the host unit 6 may change the downlink and uplink signal ratios after a period n times (n is an integer equal to or greater than 2) as long as the fixed period has lapsed.

In this case, the host unit 6 may change the downlink and uplink signal ratios in a case where a response indicating that change of a signal ratio pattern is accepted is received from the communication partner apparatus within the period n times as long as the fixed period.

Figure 2A:
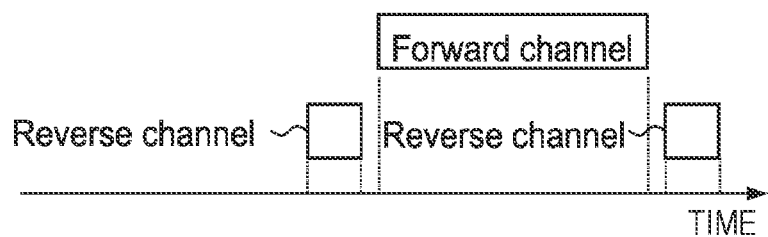
FIG. 2A is a diagram showing an uplink signal transmission period from a slave apparatus to a master apparatus and a downlink signal transmission period from a master apparatus to a slave apparatus in a TDD system.
Figure 2B:
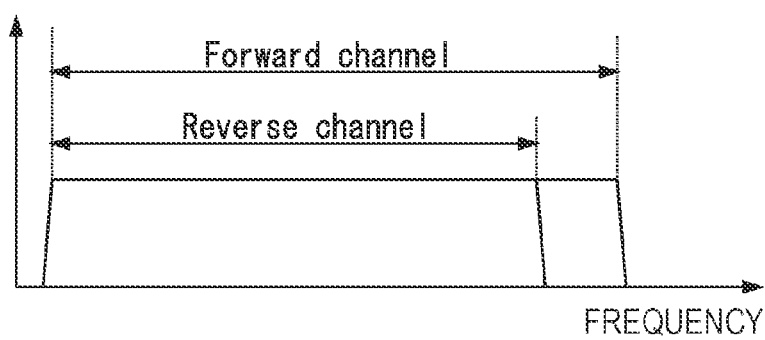
FIG. 2B is a diagram showing a frequency band used for uplink signal transmission and a frequency band used for downlink signal transmission in a TDD system.

FIGS. 2A and 2B are diagram showing the TDD system. In the TDD system, signal transmission from the master apparatus 3 to the slave apparatus 4 and signal transmission from the slave apparatus 4 to the master apparatus 3 are performed by time division. More specifically, the fixed period is time-divided in units of predetermined fixed period, and signal transmission from the master apparatus 3 to the slave apparatus 4 and signal transmission from the slave apparatus 4 to the master apparatus 3 are performed in a switching manner.

FIG. 2A is a diagram showing an uplink signal transmission period from the slave apparatus 4 to the master apparatus 3 and a downlink signal transmission period from the master apparatus 3 to the slave apparatus 4 in the TDD system. In FIG. 2A, the above-described fixed period is referred to as one TDD cycle. An uplink signal transmission period and a downlink signal transmission period are provided so as not to overlap each other within one TDD cycle. FIG. 2A shows an example in which the signal transmission period of the downlink signal (referred to as Rv or reverse channel) from the master apparatus 3 to the slave apparatus 4 is extremely shorter than the signal transmission period of the uplink signal (referred to as Fw or forward channel) from the slave apparatus 4 to the master apparatus 3, i.e., an example in which the signal ratio of the signal Rv is extremely smaller than the signal ratio of the signal Fw. For example, in a case where a video signal captured by the sensor 12 in the slave apparatus 4 is transmitted to the master apparatus 3, the signal ratio becomes as shown in FIG. 2A.

FIG. 2B is a diagram showing the frequency band used for uplink signal transmission and the frequency band used for downlink signal transmission in the TDD system. In FIG. 2B, the horizontal axis represents frequency, and the vertical axis represents signal intensity. As shown in FIG. 2B, most of the frequency bands overlap in the uplink Fw signal transmission and the downlink Rv signal transmission. For example, in a case where the video signal captured by the sensor 12 in the slave apparatus 4 is transmitted to the master apparatus 3, the uplink Fw signal transmission having a large signal amount requires a wider frequency band than that of the downlink Rv signal transmission, and hence the signal transmission is performed using a wider frequency band including a frequency band used for the downlink Rv signal transmission. In the TDD system, as shown in FIG. 2A, since the signal transmission period of the uplink signal Fw does not overlap the signal transmission period of the downlink signal Rv, an echo cancellation circuit for separating both signals becomes unnecessary.

Figure 2C:
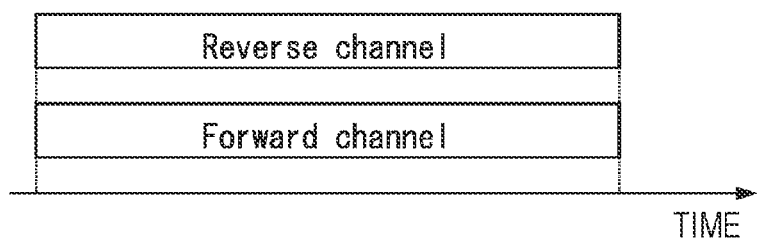
FIG. 2C is a diagram showing an uplink signal transmission period from a slave apparatus to a master apparatus and a downlink signal transmission period from a master apparatus to a slave apparatus in an FDD system.
Figure 2D:
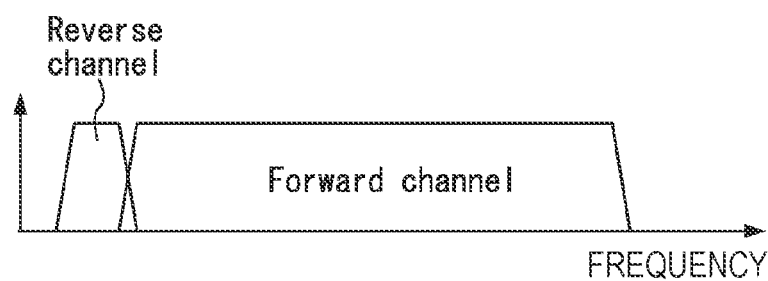
FIG. 2D is a diagram showing a frequency band used for uplink signal transmission and a frequency band used for downlink signal transmission in the FDD system.

Although the master apparatus 3 and the slave apparatus 4 in FIG. 1 assume performing signal transmission by the TDD system, the signal transmission may be performed by the FDD system in some cases. FIGS. 2C and 2D are diagram showing the FDD system. In the FDD system, the frequency band used for signal transmission from the master apparatus 3 to the slave apparatus 4 is different from the frequency band used for signal transmission from the slave apparatus 4 to the master apparatus 3.

Therefore, signal transmission from the master apparatus 3 to the slave apparatus 4 and signal transmission from the slave apparatus 4 to the master apparatus 3 can be performed at the same timing.

FIG. 2C is a diagram showing an uplink signal transmission period from the slave apparatus 4 to the master apparatus 3 and a downlink signal transmission period from the master apparatus 3 to the slave apparatus 4 in the FDD system. As shown in the figure, both the uplink signal transmission and the downlink signal transmission are performed using the entire period within one FDD cycle.

FIG. 2D is a diagram showing the frequency band used for uplink signal transmission and the frequency band used for downlink signal transmission in the FDD system. In FIG. 2D, the horizontal axis represents frequency, and the vertical axis represents signal intensity. As shown in FIG. 2D, uplink signal transmission with a large signal amount is performed using a wide frequency band on the high frequency side. Downlink signal transmission with a small signal amount is performed using a narrow frequency band on the low frequency side. In FIG. 2D, in order to increase the frequency utilization efficiency, the frequency band used in the uplink signal transmission and the frequency band used in the downlink signal transmission are partially overlapped. Because of this overlapping portion, an echo cancellation circuit is required. The echo cancellation circuit is a circuit accurately separating an uplink signal and a downlink signal.

Figure 3:
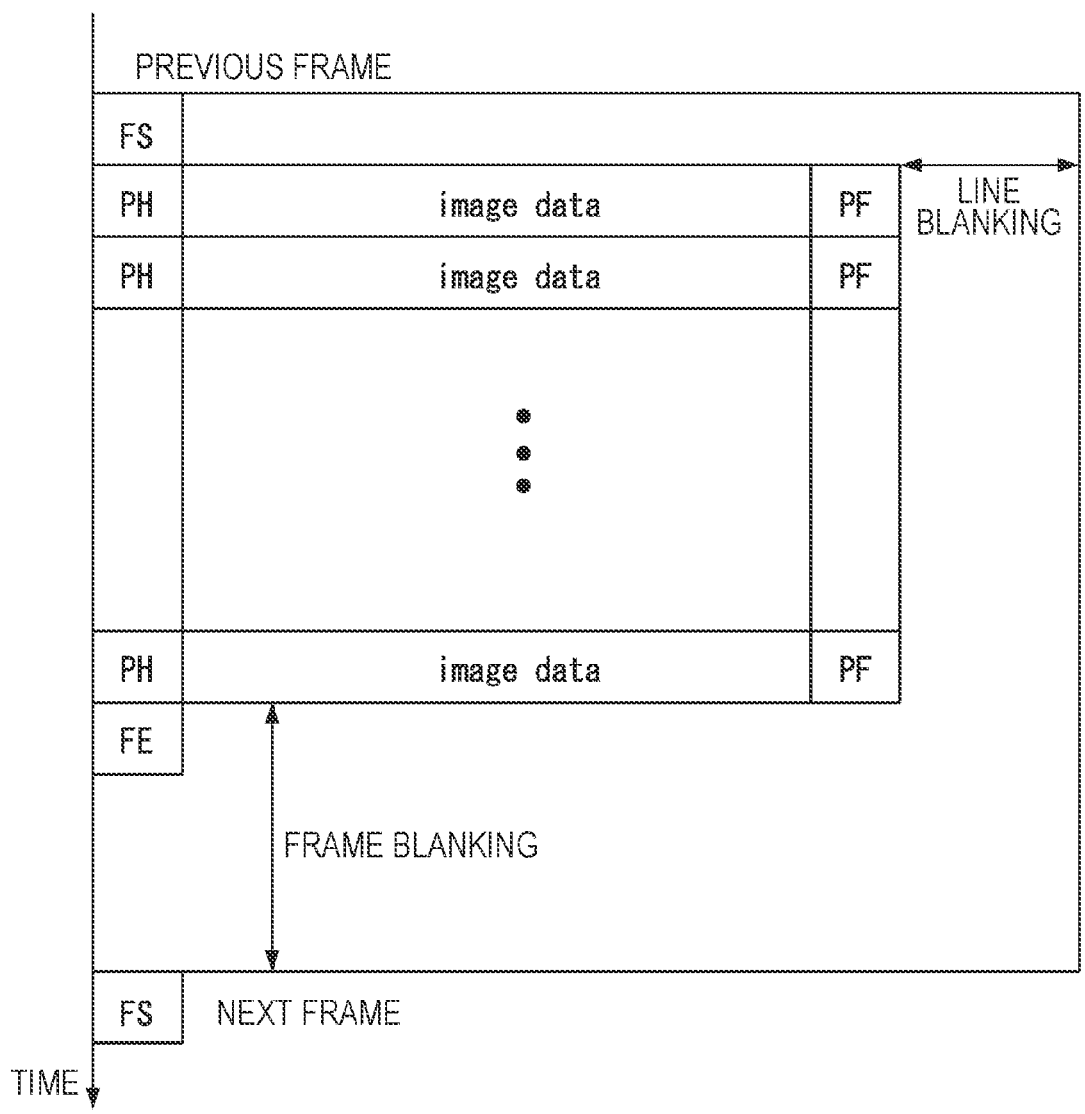
FIG. 3 is a diagram showing a format of a signal to be output by an image sensor.

FIG. 3 is a diagram showing a format of a signal to be output by an image sensor that is an example of the sensor 12. The image sensor capturing a moving image repeats capturing at a cycle of, for example, 60 video frames or 120 video frames per second. One video frame data has a frame start (FS), packets for a plurality of horizontal lines, and a frame end (FE).

The packet of each horizontal line has a packet header (PH), pixel data for one horizontal line, and a packet footer (PF). In this description, a packet is sometimes referred to as a video signal.

One horizontal line period includes a transmission period of the above-described packet and a horizontal blanking period. The horizontal blanking period has a length of about several % to 10% of one horizontal line period and is a period in which a video signal (packet) is not transmitted.

One video frame period includes a plurality of horizontal line periods and a frame blanking period (also referred to as a vertical blanking period). The frame blanking period has a length of about 10% of one video frame period and is a period in which a video signal (packet) is not transmitted.

When transmitting a video signal captured by the image sensor to the master apparatus 3, the slave apparatus 4 transmits the packet of each horizontal line in order from the uppermost line in accordance with the format shown in FIG. 3.

Figure 4:
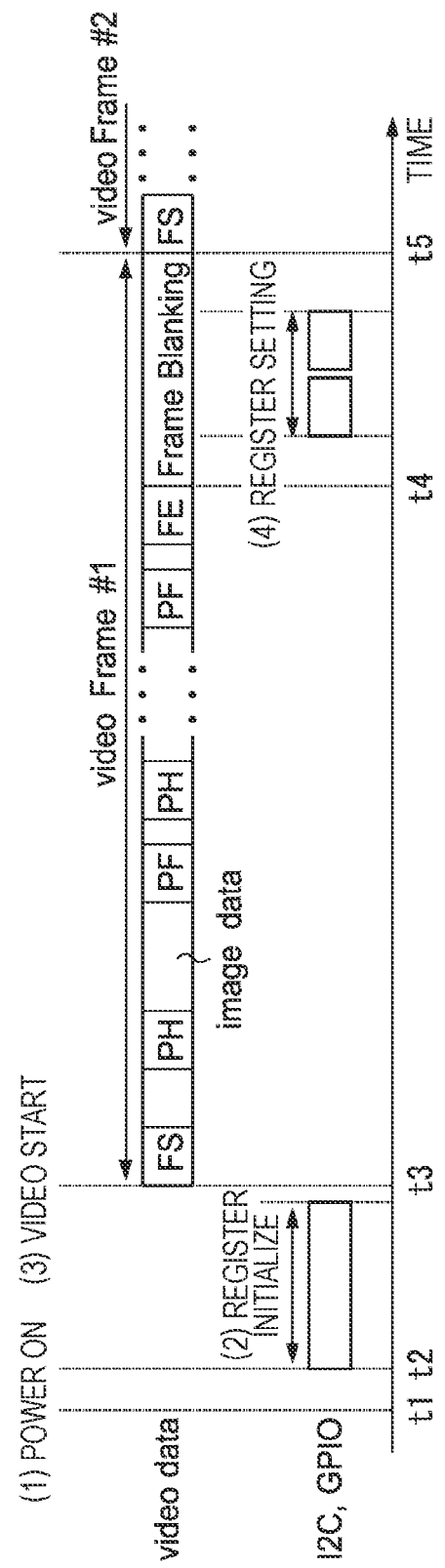
FIG. 4 is a diagram showing a timing of a signal transmitted and received between the master apparatus and the slave apparatus.

FIG. 4 is a diagram showing a timing of a signal transmitted and received between the master apparatus 3 and the slave apparatus 4 in a case where the slave apparatus 4 includes an image sensor. If the power of the communication system 2 of FIG. 1 is turned on at a time t1, the master apparatus 3 transmits, to the slave apparatus 4 via the cable 5 at a subsequent time t2, a signal for initializing the slave apparatus 4 and a control signal for performing security authentication and key exchange to and from the slave apparatus 4. If, upon completing the initialization of the slave apparatus 4, the security authentication and key exchange between the master apparatus 3 and the slave apparatus 4 are successful, the slave apparatus 4 starts transmission of a video signal via the cable 5 from a time t3. As shown in FIG. 3, the video signal transmitted by the slave apparatus 4 includes a blanking period (t4 to t5) in places. Within the blanking period, there may be no signal, null data may be transmitted, or a signal other than a video signal may be transmitted.

From the time t3 to t4, a video signal for one video frame is transmitted. In a case where the master apparatus 3 changes the operation state of the slave apparatus 4, for example, in a case of changing the operation mode of the image sensor, the master apparatus 3 transmits a control signal to the slave apparatus 4 via the cable 5 within a frame blanking period after having transmitted a video signal for one video frame. The slave apparatus 4 having received the control signal can change, for example, the operation mode of the image sensor in accordance with the contents of the control signal. The control signal from the master apparatus 3 may be transmitted in a horizontal blanking period within one horizontal line period.

Thus, since the master apparatus 3 transmits the control signal for controlling the slave apparatus 4 in the frame blanking period or the horizontal blanking period, the master apparatus 3 can transmit and receive the control signal to and from the slave apparatus 4 without having a negative impact on the transmission of the video signal.

In the communication system 2 according to the present embodiment, the ratio of a downlink signal transmitted from the master apparatus 3 to the slave apparatus 4 and the ratio of an uplink signal transmitted from the slave apparatus 4 to the master apparatus 3 are changed in accordance with the signal transmission state between the master apparatus 3 and the slave apparatus 4. The control of changing the signal ratio is performed by the host unit 6 in the master apparatus 3, for example. Alternatively, this control may be performed by the slave apparatus 4.

Figure 5:
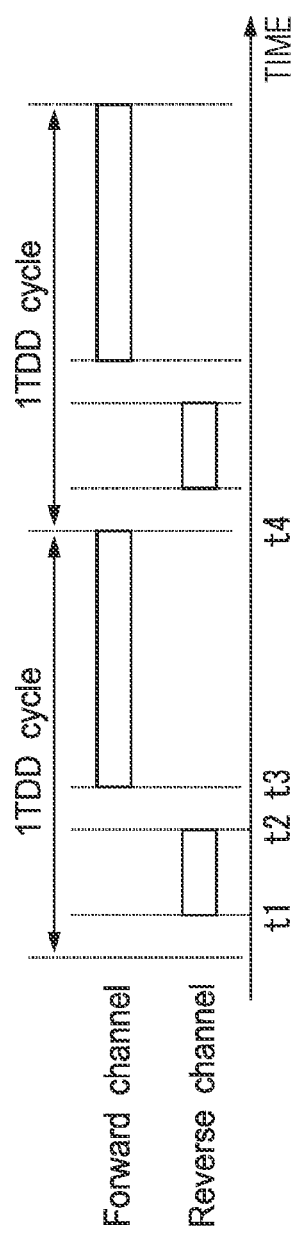
FIG. 5 is a diagram showing in detail a signal ratio when transmitting a video signal from the slave apparatus to the master apparatus.

FIG. 5 is a diagram showing in detail a signal ratio when transmitting a video signal from the slave apparatus 4 to the master apparatus 3. The upper part of FIG. 5 shows a signal (Fw, forward channel) to be transmitted from the slave apparatus 4 to the master apparatus 3, and the lower part thereof shows a signal (Rv, reverse channel) transmitted from the master apparatus 3 to the slave apparatus 4. As shown in the figure, at the time t1 to t2, a control signal, for example, is transmitted from the master apparatus 3 to the slave apparatus 4. The control signal is a signal for performing initialization of the slave apparatus 4, for example. The time t2 to t3 are the no-signal period.

Thereafter, in the time t3 to t4, a video signal is transmitted from the slave apparatus 4 to the master apparatus 3. Here, for example, a video signal for one video frame is transmitted. The time t1 to t4 are one TDD cycle, and subsequently, for each TDD cycle, the signal Fw and the signal Rv are switched by time division at a predetermined signal ratio and transmitted.

In the example of FIG. 5, the signal ratio of the signal transmitted from the slave apparatus 4 to the master apparatus 3 is overwhelmingly larger than the signal ratio of the signal transmitted from the master apparatus 3 to the slave apparatus 4. This is because the signal amount of the video signal transmitted from the slave apparatus 4 to the master apparatus 3 is large. As will be described later, the signal ratio of the signal transmitted and received between the master apparatus 3 and the slave apparatus 4 can be different from that in FIG. 5 other than the signal transmission state in which the video signal is transmitted.

Figure 6:
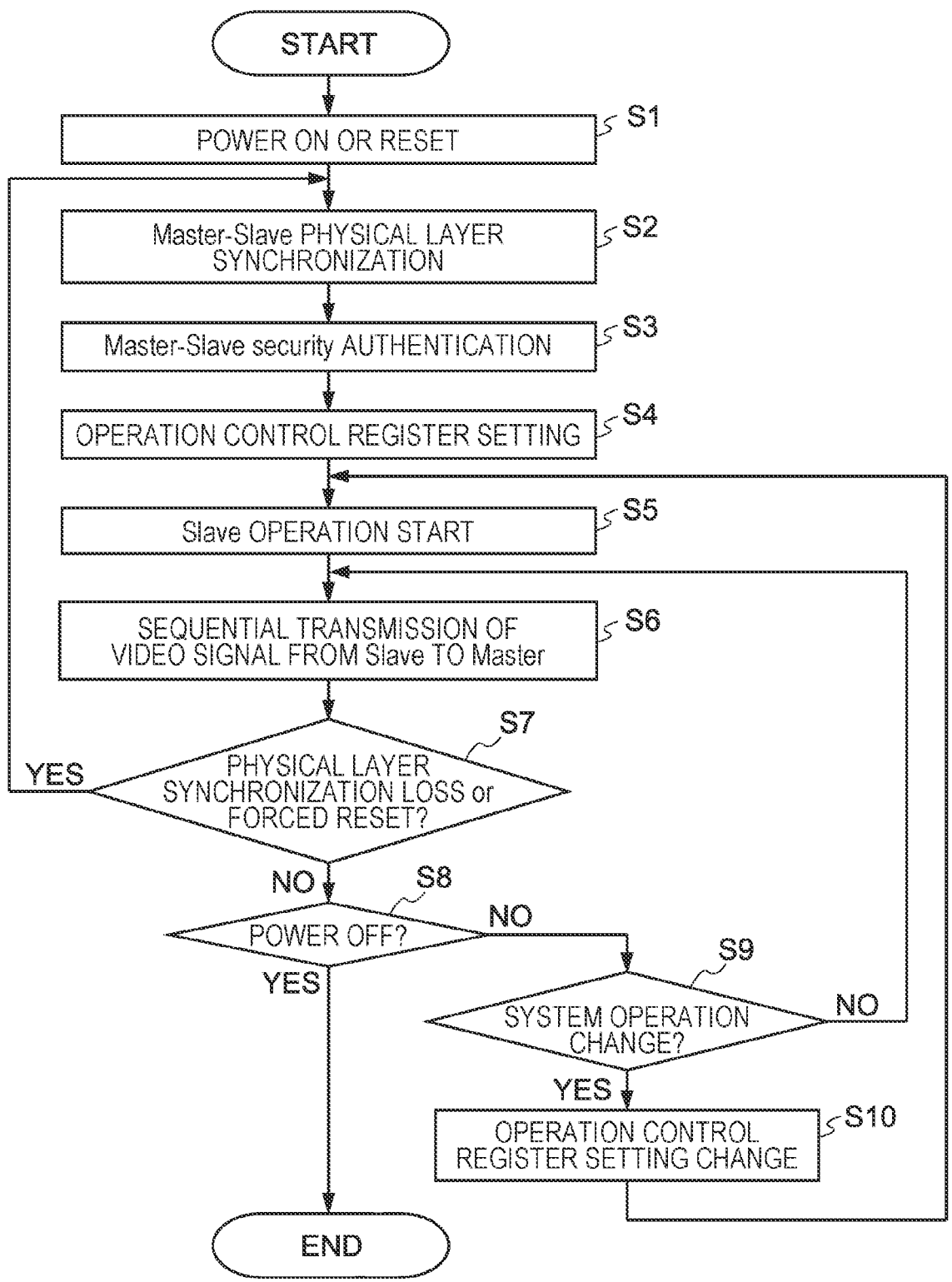
FIG. 6 is a flowchart showing an example of a processing procedure of the communication system of FIG. 1.

FIG. 6 is a flowchart showing an example of the processing procedure of the communication system 2 of FIG. 1. This flowchart shows the processing procedure in a case where an image sensor is provided on the slave apparatus 4 side and a video signal captured by the image sensor is transmitted from the slave apparatus 4 to the master apparatus 3. The master apparatus 3 is an electronic control unit (ECU) mounted on a vehicle, for example, and the slave apparatus 4 is a camera on which an image sensor is mounted.

First, the power of the communication system 2 of FIG. 1 is turned on or reset (step S1). Next, physical layers are synchronized between the master apparatus 3 and the slave apparatus 4 to establish the connection between the master SerDes unit 7 and the slave SerDes unit 13 (step S2). Next, security authentication and key exchange are performed between the master apparatus 3 and the slave apparatus 4 (step S3). Here, for example, the master apparatus 3 and the slave apparatus 4 authenticate each other that they are legitimate communication partners.

For example, after establishing mutual authentication by mutually transmitting and receiving mutual authentication protocols such as SSL/TLS, key exchange is performed to share a secret key. This allows encryption communication to be performed between the master apparatus 3 and the slave apparatus 4 thereafter. The amount of signals transmitted and received between the master apparatus 3 and the slave apparatus 4 when steps S2 and S3 are performed is substantially equal, and the signal ratio between the signals Fw and Rv is about 1:1.

Next, an operation control register of at least one of the master apparatus 3 or the slave apparatus 4 is set (step S4). For example, information for properly operating the image sensor or camera of the slave apparatus 4 is set in the operation control register.

The operation control register is provided in at least one of the first LINK unit 11 or the second LINK unit 17, for example. In FIG. 1, the first LINK unit 11 and the second LINK unit 17 are provided with the storage units 11*a* and 17*a*, respectively, but these storage units 11*a* and 17*a* may also serve as the operation control register.

In a case where the operation control register is provided in the slave apparatus 4, the master apparatus 3 transmits a control signal to the slave apparatus 4 via the cable 5, and the operation control register in the slave apparatus 4 is set by the control signal. In addition, the slave apparatus 4 transmits, to the master apparatus 3 via the cable 5, a response signal indicating whether or not the setting of the operation control register has ended. When the processing of step S4 is performed, the signal amount of the signal Rv transmitted from the master apparatus 3 to the slave apparatus 4 is much larger than the signal amount of the signal Fw transmitted from the slave apparatus 4 to the master apparatus 3, and the signal ratios are also significantly different.

Next, the operation of the slave apparatus 4 is started (step S5). In a case where the slave apparatus 4 is a camera, capturing by the image sensor is started. The slave apparatus 4 sequentially transmits video signals to the master apparatus 3 in units of video frame (step S6).

During the processing of step S6, the signal amount and the signal ratio of the signal Fw transmitted from the slave apparatus 4 to the master apparatus 3 become much larger than the signal amount and the signal ratio of the signal Rv transmitted from the master apparatus 3 to the slave apparatus 4.

Thereafter, the slave apparatus 4 transmits a video signal in units of video frame to the master apparatus 3, except a case of an occurrence of an abnormality such as physical layer synchronization loss of the master SerDes unit 7 and the slave SerDes unit 13.

During transmission of the video signal, whether or not the above-described physical layer synchronization loss or forced reset has occurred is monitored (step S7), and if the above-described physical layer synchronization loss or forced reset has occurred, the processing of step S2 and thereafter is performed. In addition, it is also monitored whether or not the power of at least one of the master apparatus 3 or the slave apparatus 4 has been turned off (step S8), and if the power has been turned off, the processing of FIG. 6 is ended.

It is determined whether or not a need to change the operation of the communication system 2 shown in FIG. 1 has arisen while continuing the processing of steps S5 to S6 (step S9). In a case where operation change is not necessary, the operation of step S6 and thereafter is continued to be performed. If the need for operation change has arisen, the setting of the operation control register of at least one of the master apparatus 3 or the slave apparatus 4 is changed (step S10). After that, the processing of step S5 and thereafter is continued to be performed.

As described above, in the present embodiment, the signal ratio of the signal Rv from the master apparatus 3 to the slave apparatus 4 and the signal ratio of the signal Fw from the slave apparatus 4 to the master apparatus 3 are changed in accordance with the signal transmission state of the communication system 2 of FIG. 1. For example, as shown in FIG. 5, in a case where a video signal is transmitted from the slave apparatus 4 to the master apparatus 3, the signal ratio of the signal Fw becomes overwhelmingly larger than the signal ratio of the signal Rv, but if the signal ratio in this case is constantly maintained, in a case where it is necessary to transmit and receive a signal equally between the master apparatus 3 and the slave apparatus 4 as in step S2 of FIG. 6, or in a case where the signal amount of the signal Rv is larger than the signal amount of the signal Fw as in step S4 of FIG. 6, the transmission of a signal from the master apparatus 3 to the slave apparatus 4 takes a long time, and initialization, security authentication, and the key exchange of the slave apparatus 4 take an extra time and the setting of the operation control register of the slave apparatus 4 is difficult to be performed quickly, thereby reducing the communication efficiency.

The video signal in step S6 of FIG. 6 is transmitted in units of video frame, and each video frame has a frame blanking period. Even if a video signal is transmitted from the slave apparatus 4 to the master apparatus 3 within this frame blanking period, the master apparatus 3 does not use the video signal within the frame blanking period, and hence it is desirable not to transmit the video signal from the slave apparatus 4 to the master apparatus 3 within the frame blanking period. Therefore, within the frame blanking period, it is desirable that the transmission of the video signal from the slave apparatus 4 to the master apparatus 3 is stopped, and instead, a control signal or the like for changing the operation of the slave apparatus 4 can be transmitted from the master apparatus 3 to the slave apparatus 4, for example.

Thus, in a case where signal transmission is performed by the TDD system between the master apparatus 3 and the slave apparatus 4, the amount of signals transmitted and received between the master apparatus 3 and the slave apparatus 4 greatly varies depending on the signal transmission state, and hence the ratio of signals transmitted and received between the master apparatus 3 and the slave apparatus 4 is made variable depending on the signal transmission state, thereby allowing communication efficiency to be improved and power consumption to be reduced.

Figure 7:
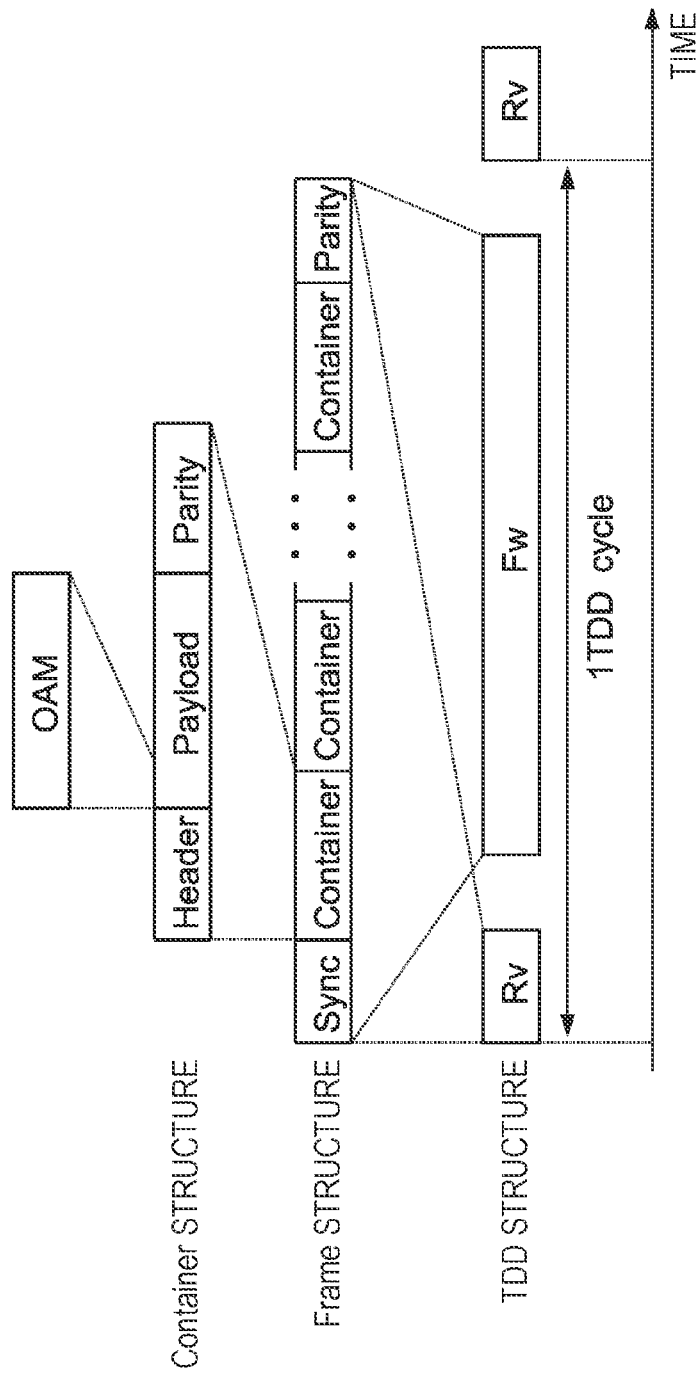
FIG. 7 is a diagram showing an example of a frame structure of a signal transmitted and received between the master apparatus and the slave apparatus.

FIG. 7 is a diagram showing an example of the frame structure of a signal transmitted and received between the master apparatus 3 and the slave apparatus 4. The frame structure of the signal transmitted from the master apparatus 3 to the slave apparatus 4 and the frame structure of the signal transmitted from the slave apparatus 4 to the master apparatus 3 are the same, as shown in FIG. 7.

The frame structure of FIG. 7 includes a plurality of containers between a sync pattern and parity. The sync pattern is a signal pattern for synchronizing the physical layers of the master SerDes unit 7 and the slave SerDes unit 13. The plurality of containers includes, for example, about 2 to 100 containers. The number of containers included in the frame structure varies depending on the signal transmission state. The parity is a bit or a bit string for error detection or error correction processing.

The container structure includes header, payload, and parity. The header includes address information indicating the transmission destination of the payload, for example. The payload is the body of the signal to be transmitted and received. The payload includes an operation administration and maintenance (OAM) for SerDes control in addition to the video signal. The parity is a bit or a bit string for error detection or error correction processing of the payload.

The signal ratio of the signal Rv from the master apparatus 3 to the slave apparatus 4 within one TDD cycle and the signal ratio of the signal Fw from the slave apparatus 4 to the master apparatus 3 can be changed by changing the number of containers included in each frame structure. It is to be noted that the size of the containers of the signal Rv and the signal Fw may be the same or different.

Figure 8:
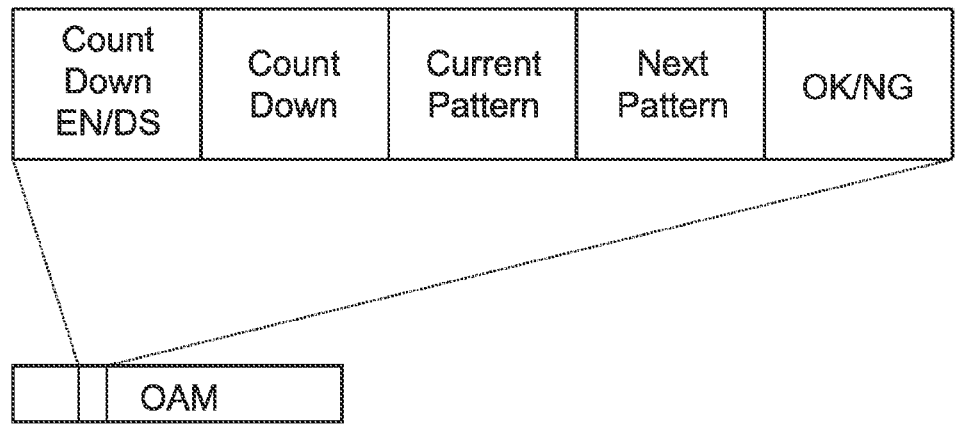
FIG. 8 is a diagram showing a structure of control information for controlling the signal ratio from the master apparatus to the slave apparatus and the signal ratio from the slave apparatus to the master apparatus in one TDD cycle, the control information included in a transmission frame structure and transmitted.

FIG. 8 is a diagram showing a structure of control information (hereinafter referred to as frame structure control information) for controlling the signal ratio from the master apparatus 3 to the slave apparatus 4 and the signal ratio from the slave apparatus 4 to the master apparatus 3 in one TDD cycle, the control information included in a transmission frame structure and transmitted. This frame structure control information is included in the OAM.

As shown in FIG. 8, the frame structure control information includes Count Down EN/DS, Count Down, Current Pattern, Next Pattern, and OK/NG. Count Down EN/DS is information indicating whether or not a countdown value for counting the number of TDD cycles until the signal ratio of the signal Rv from the master apparatus 3 to the slave apparatus 4 and the signal Fw from the slave apparatus 4 to the master apparatus 3 is changed is normally functioning. If functioning normally, it becomes EN, which means Enable, and if not functioning, it becomes DS, which means Disable. In the present embodiment, countdown is performed for each TDD cycle from the initial value of the counter, and when the count value becomes zero, the signal ratio between the signal Rv and the signal Fw is changed.

Count Down indicates the number of TDD cycles until the signal ratio between the signal Rv and the signal Fw is changed, and is a count value after the countdown. When Count Down becomes zero from 1, the signal Rv and the signal Fw are switched to a new signal ratio.

Figure 9:
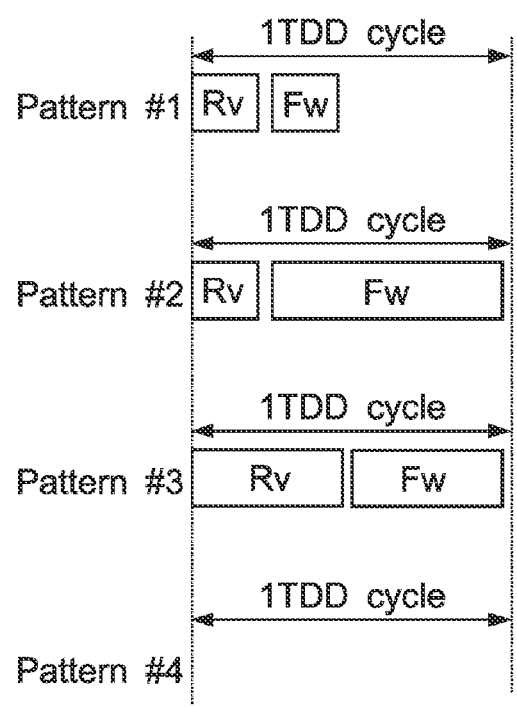
FIG. 9 is a diagram showing an example of a type of a signal ratio pattern.

Current Pattern is a signal ratio pattern representing the signal ratio between the signal Rv and the signal Fw that are currently transmitted. FIG. 9 is a diagram showing an example of the type of the signal ratio pattern. Pattern #1 is a signal ratio pattern in which the signal ratio between the signal Rv to the signal Fw is about 1:1 and the non-signal period within one TDD cycle is long. In Pattern #1, the number of containers included in the signal Rv and the signal Fw is about a few, and Pattern #1 is selected, for example, in a case where information for maintaining synchronization is transmitted and received between the master apparatus 3 and the slave apparatus 4.

Pattern #2 is a signal ratio pattern in which the signal ratio of the signal Fw is extremely larger than the signal ratio of the signal Rv. Pattern #2 is selected, for example, in a case where a large amount of video signals are transmitted from the slave apparatus 4 to the master apparatus 3.

In Pattern #3, the signal ratio between the signal Rv and the signal Fw is about 1:1. Pattern #3 is selected in a case where a control signal for setting the operation control register is transmitted from the master apparatus 3 to the slave apparatus 4, or in a case where security authentication and key exchange are performed between the master apparatus 3 and the slave apparatus 4.

Pattern #4 is a signal ratio pattern in which the entire one TDD cycle is a no-signal period. Pattern #4 is selected in a case where the transmission of the signal Rv and the signal Fw is stopped.

In OK/NG, the slave apparatus 4 or the master apparatus 3 receiving the frame structure control information whose Count Down EN/DS is EN from the master apparatus 3 or the slave apparatus 4 whose signal ratio between the signal Rv and the signal Fw is desired to change returns OK in a case of agreeing to the change of the signal ratio, and returns NOT in a case of disagreeing to the same.

Figure 10:
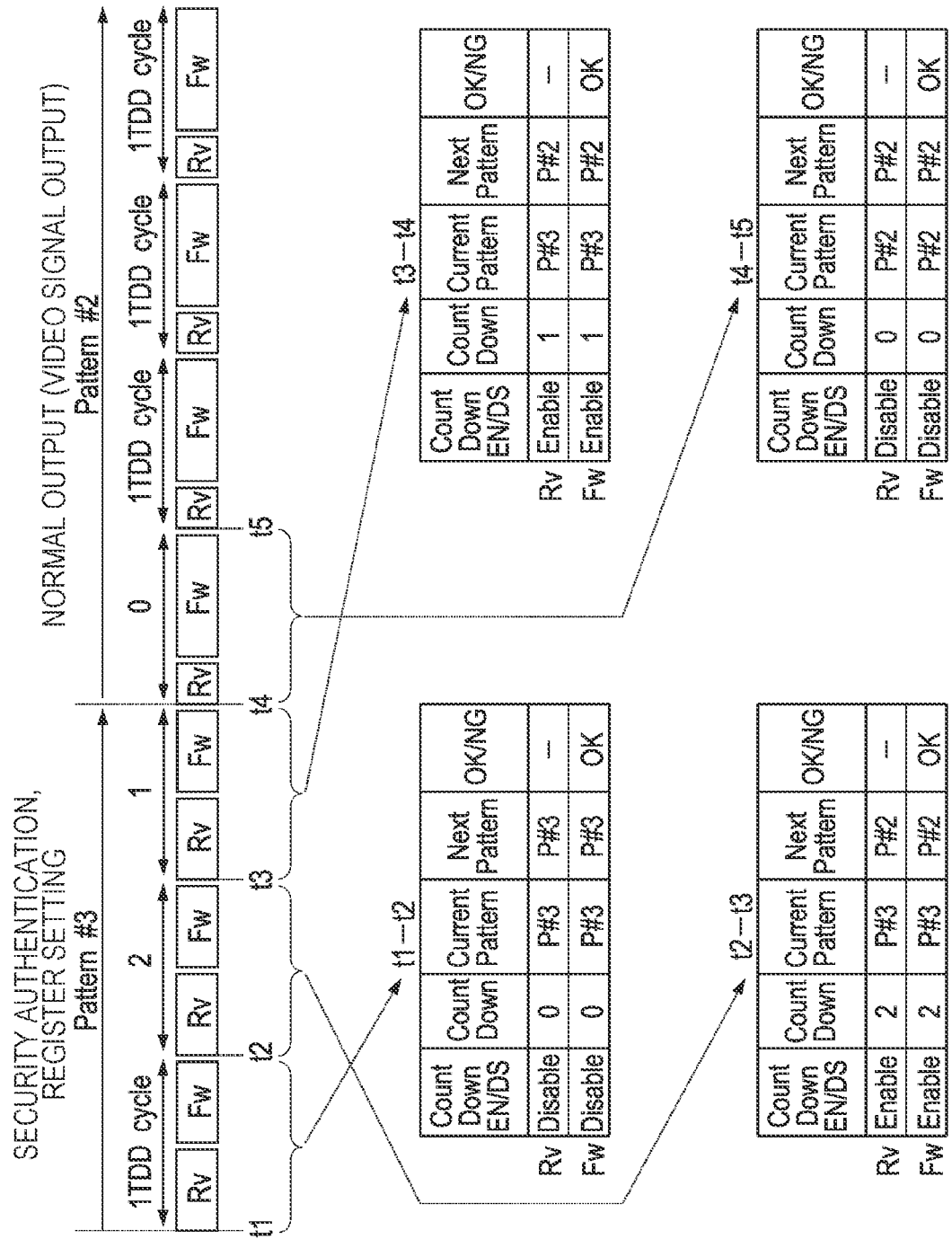
FIG. 10 is a diagram showing a first example of control to change the signal ratio in one TDD cycle.

FIG. 10 is a diagram showing the first example of control to change the signal ratio between the signal Rv and the signal Fw in one TDD cycle. FIG. 10 shows an example in which the signal ratio is changed when the state of performing security authentication, key exchange, and operation control register setting between the master apparatus 3 and the slave apparatus 4 is switched to the state of transmitting a video signal from the slave apparatus 4 to the master apparatus 3.

FIG. 10 shows an example in which 2 is set as an initial value of the counter within a period for performing security authentication, key exchange, and operation control register setting, countdown is performed for each TDD cycle, and when the count value becomes zero, the signal ratio is changed.

One TDD cycle from the time t1 to t2, one TDD cycle from the time t2 to t3, and one TDD cycle from the time t3 to t4 are periods in which security authentication, key exchange, and operation control register setting are performed. In one TDD cycle of the time t1 to t2, Count Down EN/DS in the frame structure control information of the signal Rv is Disable, Count Down is zero, Current Pattern is Pattern #3, Next Pattern is Pattern #3, and OK/NG is don't care. Count Down EN/DS of the signal Fw is Disable, Count Down is zero, Current Pattern is Pattern #3, Next Pattern is Pattern #2, and OK/NG is OK.

In one TDD cycle of the time t2 to t3, Count Down EN/DS in the frame structure control information of the signal Rv is Enable, Count Down is 2, Current Pattern is Pattern #3, Next Pattern is Pattern #2, and OK/NG is don't care. Count Down EN/DS of the signal Fw is Enable, Count Down is 2, Current Pattern is Pattern #3, Next Pattern is Pattern #2, and OK/NG is OK.

In one TDD cycle of the time t3 to t4, Count Down in the frame structure control information of the signal Rv changes to 1. In addition, Count Down of the signal Fw also changes to 1.

In one TDD cycle of the time t4 to t5, Count Down EN/DS in the frame structure control information of the signal Rv is Disable, Count Down is zero, Current Pattern is Pattern #2, Next Pattern is Pattern #2, and OK/NG is don't care. Count Down EN/DS of the signal Fw is Disable, Count Down is zero, Current Pattern is Pattern #2, Next Pattern is Pattern #2, and OK/NG is OK.

Thus, since Current Pattern is Pattern #3 within the period from the time t1 to t3, a signal ratio suitable for performing operation control register setting, security authentication, and key exchange is selected between the master apparatus 3 and the slave apparatus 4 as shown in FIG. 9. In addition, at the time t4, since Count Down becomes zero, Current Pattern is switched from Pattern #3 to Pattern #2, and the signal ratio becomes suitable for transmitting a large amount of video signals from the slave apparatus 4 to the master apparatus 3.

Figure 11:
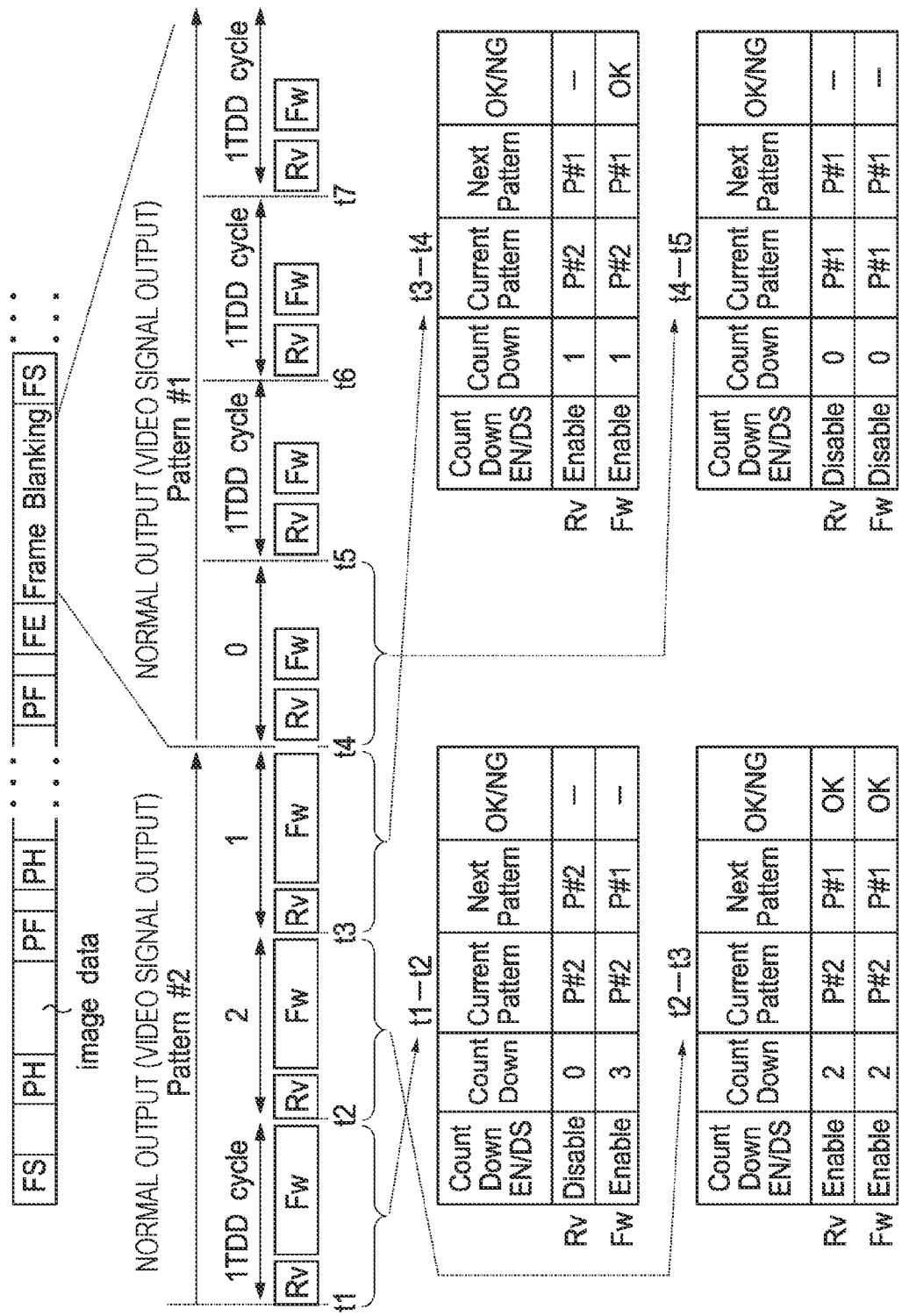
FIG. 11 is a diagram showing a second example of control to change the signal ratio in one TDD cycle.

FIG. 11 is a diagram showing a second example of control to change the signal ratio between the signal Rv and the signal Fw in one TDD cycle. FIG. 11 shows an example in which the signal ratio is switched within a frame blanking period during which a video signal is transmitted from the slave apparatus 4 to the master apparatus 3.

One TDD cycle from the time t1 to t2, one TDD cycle from the time t2 to t3, and one TDD cycle from the time t3 to t4 are periods in which video signals are transmitted from the slave apparatus 4 to the master apparatus 3.

The time t4 and thereafter are periods in which transmission of a signal other than the video signal is performed between the master apparatus 3 and the slave apparatus 4 such as switching the signal ratio within the frame blanking period.

In one TDD cycle of the time t1 to t2, Count Down EN/DS in the frame structure control information of the signal Rv is Disable, Count Down is zero, Current Pattern is Pattern #2, Next Pattern is Pattern #2, and OK/NG is don't care. Count Down EN/DS of the signal Fw is Enable, Count Down is 3, Current Pattern is Pattern #2, Next Pattern is Pattern #1, and OK/NG is OK.

In one TDD cycle of the time t2 to t3, Count Down EN/DS in the frame structure control information of the signal Rv is Enable, Count Down is 2, Current Pattern is Pattern #2, Next Pattern is Pattern #1, and OK/NG is don't care. Count Down EN/DS of the signal Fw is Enable, Count Down is 2, Current Pattern is Pattern #2, Next Pattern is Pattern #1, and OK/NG is OK.

In one TDD cycle of the time t3 to t4, Count Down in the frame structure control information of the signal Rv and the signal Fw both become 1.

In one TDD cycle of the time t4 to t5, Count Down EN/DS in the frame structure control information of the signal Rv is Disable, Count Down is zero, Current Pattern is Pattern #1, Next Pattern is Pattern #1, and OK/NG is don't care. Count Down EN/DS of the signal Fw is Disable, Count Down is zero, Current Pattern is Pattern #1, Next Pattern is Pattern #1, and OK/NG is don't care.

Thus, the slave apparatus 4 transmits a video signal to the master apparatus 3 in units of video frame, and each video frame is provided with a frame blanking period after transmitting video signals of all lines in the video frame. Since a valid video signal is not transmitted from the slave apparatus 4 within the frame blanking period, this period can be used for other signal transmission. For example, the period can be used for the master apparatus 3 to transmit a control signal for switching the operation mode of the slave apparatus 4.

It is to be noted that although the above description has described an example in which the signal ratio is switched within the frame blanking period, since each horizontal line has a horizontal blanking period as shown in FIG. 3, switching of the signal ratio may be performed within this horizontal blanking period.

Although the above description has described an example in which a video signal captured by the image sensor in the slave apparatus 4 is transmitted from the slave apparatus 4 to the master apparatus 3 via the cable 5, the present embodiment is also applicable to, for example, a case where the slave apparatus 4 has a display unit or a processing unit, and the video signal is transmitted from the master apparatus 3 to the slave apparatus 4 via the cable 5 to be displayed on the display unit or processed by the processing unit. In this case, a signal ratio pattern in which the signal ratio of the signal Rv is overwhelmingly larger than the signal ratio of the signal Fw is newly provided, and when a video signal is transmitted from the master apparatus 3 to the slave apparatus 4, this newly provided signal ratio pattern is selected.

Since there is a horizontal blanking period and a frame blanking period also when the video signal is displayed on the display unit, signals other than the video signal may be transmitted and received between the master apparatus 3 and the slave apparatus 4 within these blanking periods. For example, a signal to switch the display resolution of the display unit may be transmitted and received.

In this manner, in the first embodiment, when signal transmission is performed by the TDD system between the master apparatus 3 and the slave apparatus 4, the signal ratio of the signal Rv transmitted from the master apparatus 3 to the slave apparatus 4 and the signal ratio of the signal Fw transmitted from the slave apparatus 4 to the master apparatus 3 are switched in accordance with the signal transmission state. This allows signal transmission to be efficiently performed between the master apparatus 3 and the slave apparatus 4, and power consumption to also be reduced.

In particular, since the signal ratio between the signal Fw and the signal Rv can be largely changed in accordance with the signal transmission state, a large amount of signals can be transmitted in a short period of time, and high-speed transmission can be achieved.

In addition, the signal ratio is switched within the frame blanking period or the horizontal blanking period during which the slave apparatus 4 transmits the video signal to the master apparatus 3, whereby various signals other than the video signal can be efficiently transmitted between the master apparatus 3 and the slave apparatus 4 without having a negative impact on the transmission of the video signal.

Second Embodiment

The second embodiment is different from the first embodiment in the frame structure control information of the signal.

The communication system 2 according to the second embodiment is configured similarly to that in FIG. 1. In addition, the system according to the second embodiment performs signal transmission between the master apparatus 3 and the slave apparatus 4 in a processing procedure similar to that in FIG. 6.

In the communication system 2 according to the second embodiment, the frame structure of the signal transmitted and received by the master apparatus 3 and the slave apparatus 4 is similar to that in FIG. 7, but the frame structure control information is different from that in FIG. 8.

Figure 12:
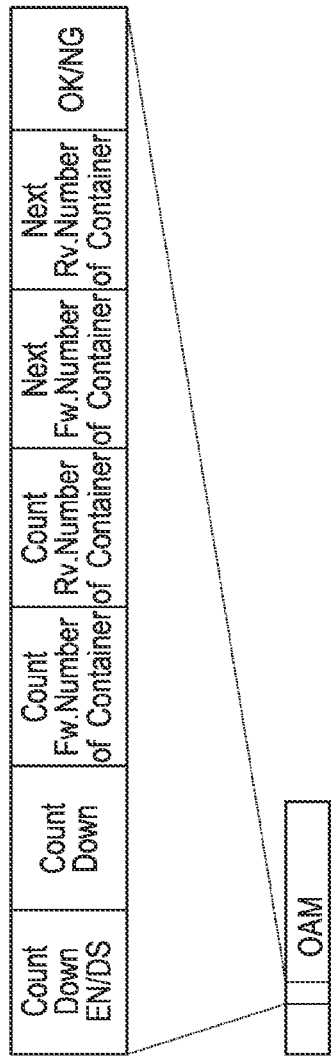
FIG. 12 is a diagram showing frame structure control information of a second embodiment.

FIG. 12 is a diagram showing frame structure control information of a second embodiment. The frame structure control information of FIG. 12 is also included in the OAM, for example. As shown in FIG. 12, the frame structure control information of the second embodiment includes Count Down EN/DS, Count Down, Current Fw Number of Container, Current Rv Number of Container, Next Fw Number of Container, Next Rv Number of Container, and OK/NG. Current Fw Number of Container is the number of containers included in the current signal Fw. Current Rv Number of Container is the number of containers included in the current signal Rv. Next Fw Number of Container is the number of containers included in the signal Fw when the signal ratio is changed next. Next Rv Number of Container is the number of containers included in the signal Rv when the signal ratio is changed next.

Since the frame structure control information of FIG. 8 described above includes a signal ratio pattern and it is already known that there is a plurality of types of signal ratio patterns as in FIG. 9, the number of containers of the signal Rv and the signal Fw can be specified by the signal ratio pattern in the frame structure control information. On the other hand, in the second embodiment, since the information on the number of containers is directly included in the frame structure control information, the signal ratio between the signal Fw and the signal Rv can be easily specified without using the signal ratio pattern.

There is a case where after starting signal transmission between the master apparatus 3 and the slave apparatus 4, it is desired to temporarily stop signal transmission for some reason and then restart the signal transmission. In such a case, how long it has elapsed before the signal transmission is restarted after stopped may be made designatable by the frame structure control information.

Figure 13:
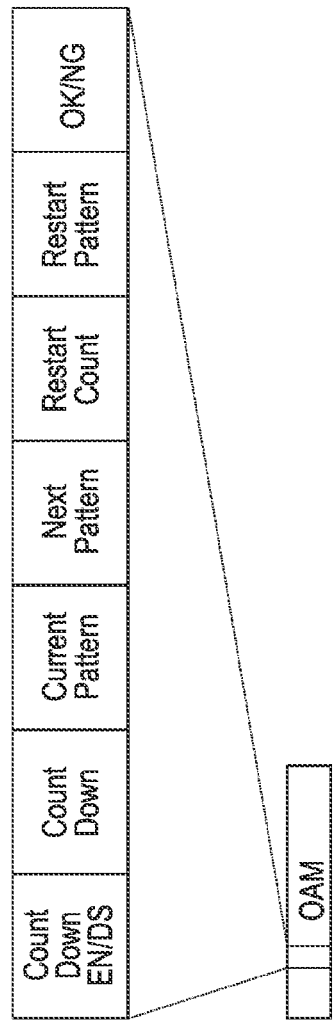
FIG. 13 is a diagram showing an example of adding information regarding restart of signal transmission to the frame structure control information of FIG. 8.

FIG. 13 is a diagram showing an example of adding information regarding restart of signal transmission to the frame structure control information of FIG. 8. The frame structure control information of FIG. 13 includes Restart count and Restart Pattern between Next pattern and OK/NG in the frame structure control information of FIG. 8. Restart count is the number of TDD cycles after the signal transmission is stopped and before the signal transmission is started. Restart Pattern is the type of the signal ratio pattern when the signal transmission is restarted.

Figure 14:
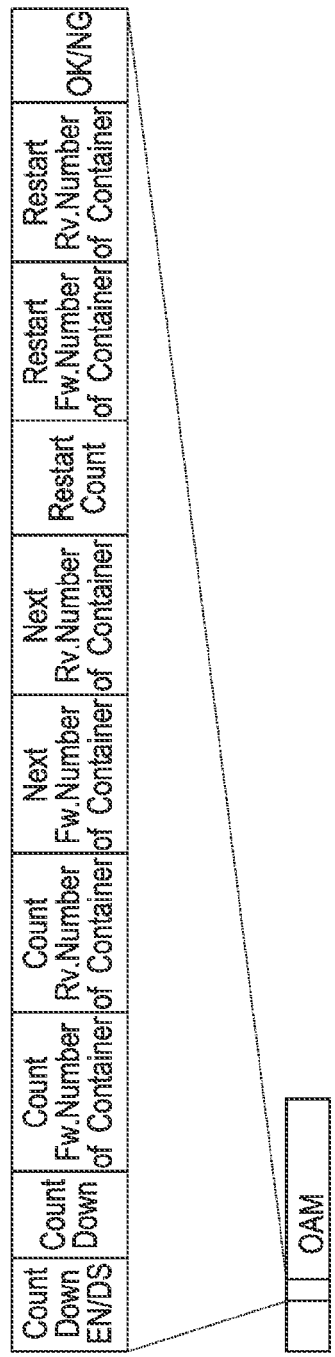
FIG. 14 is a diagram showing an example of adding information regarding restart of signal transmission to the frame structure control information of FIG. 12.

FIG. 14 is a diagram showing an example of adding information regarding restart of signal transmission to the frame structure control information of FIG. 12. The frame structure control information of FIG. 14 has Restart count, Restart Fw Number of Container, and Restart Rv Number of Container between Next Rv Number of Container and OK/NG in the frame structure control information of FIG. 12. Restart Fw Number of Container is the number of containers of the signal Fw when the signal transmission is restarted. Restart Rv Number of Container is the number of containers of the signal Rv when the signal transmission is restarted.

Figure 15:
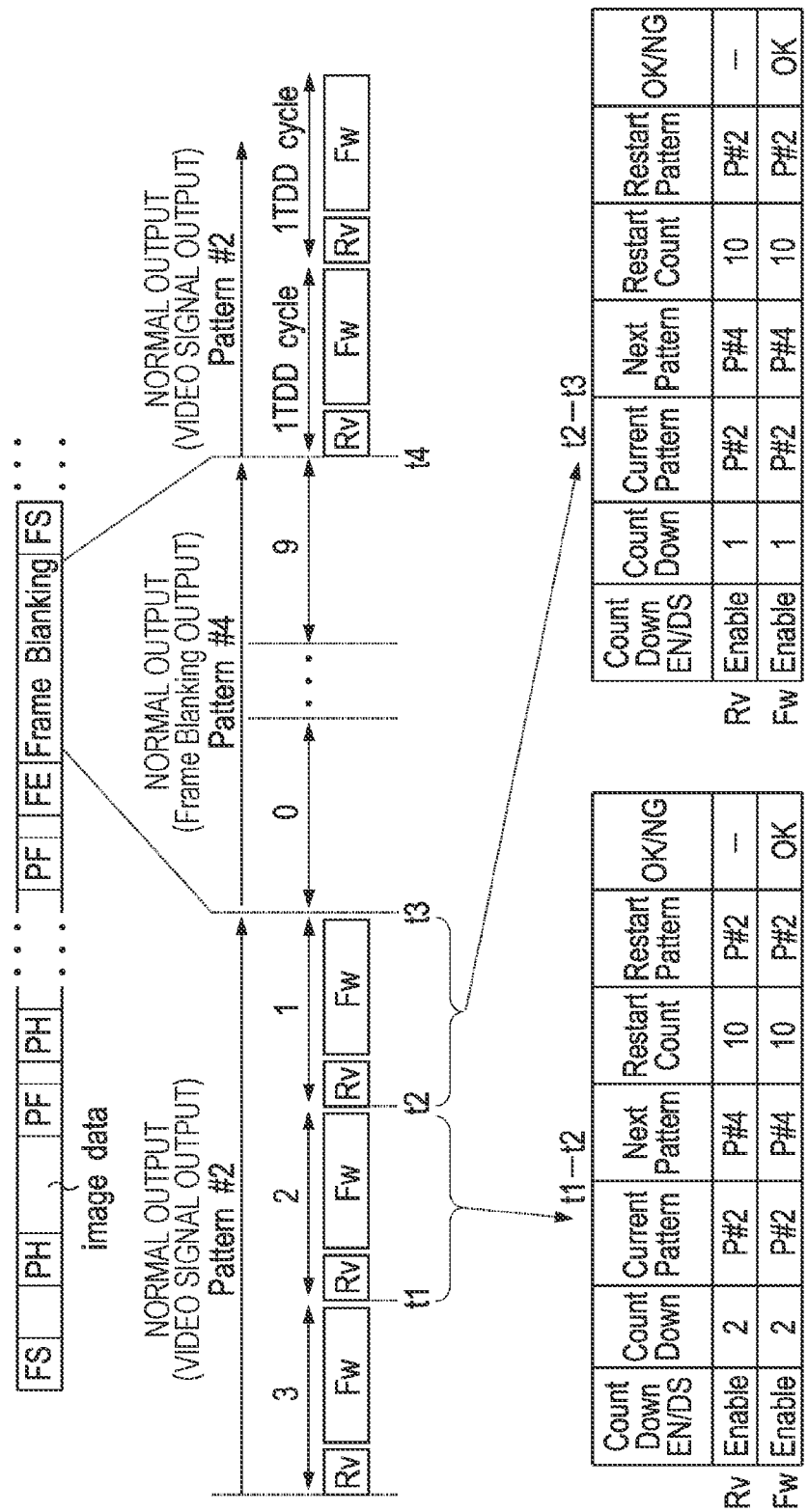
FIG. 15 is a diagram showing an example of restarting signal transmission after stopping it.

FIG. 15 is a diagram showing an example of restarting signal transmission after stopping it. The time t1 to t2 and the time t2 to t3 in FIG. 15 are periods in which video signals are transmitted from the slave apparatus 4 to the master apparatus 3. The time t3 to t4 is a frame blanking period. An example in which signal transmission is restarted after the frame blanking period has ended is shown.

In one TDD cycle of the time t1 to t2 in FIG. 15, Count Down EN/DS in the frame structure control information of the signal Rv is Enable, Count Down is 2, Current Pattern is Pattern #2, Next Pattern is Pattern #4, Restart count is 10, Restart Pattern is Pattern #2, and OK/NG is don't care. Count Down EN/DS of the signal Fw is Enable, Count Down is 2, Current Pattern is Pattern #2, Next Pattern is Pattern #4, Restart count is 10, Restart Pattern is Pattern #2, and OK/NG is OK.

In one TDD cycle from time t2 to t3, Count Down of the frame structure control information of the signal Rv and the signal Fw both become 1.

Thereafter, the time t3 to t4 is a frame blanking period in which Pattern #4 is selected as the signal ratio pattern. As shown in FIG. 9, Pattern #4 indicates that signal transmission is not performed, and the signal transmission is stopped. Therefore, at the time t4 at which Restart count value is incremented for each TDD cycle from 0 and the count value becomes 9, it becomes 10 counts as designated by Restart count of the frame structure control information, and hence the signal ratio between the signal Rv and the signal Fw is set in Pattern #2 designated by Restart Pattern of the frame structure control information, and the transmission of the video signal from the slave apparatus 4 to the master apparatus 3 is restarted.

FIG. 15 shows an example in which the information of the signal ratio pattern is included in the frame structure control information, but the information on the number of containers may be included as shown in FIG. 14.

As described above, in the second embodiment, since the number of containers of the signal Rv and the signal Fw is designated by the frame structure control information, the signal ratio between the signal Rv and the signal Fw can be easily set.

In addition, in the second embodiment, when the signal transmission is temporarily stopped during the signal transmission and then the signal transmission is restarted, the timing at which the signal transmission is restarted and the signal ratio at the time of restart are set in the frame structure control information, and hence the restart of the signal transmission can be smoothly performed.

It is to be noted that the present technology can have the following configuration.

(1) A communication apparatus includes:
  a communication unit that performs signal transmission to and from a communication partner apparatus; and
  a communication control unit that changes a signal ratio in a first direction to the communication partner apparatus and a signal ratio in a second direction from the communication partner apparatus in accordance with a signal transmission state with the communication partner apparatus.

(2) The communication apparatus according to (1), in which
  the signal transmission state includes at least one of a state in which initialization, security authentication, and key exchange of the communication partner apparatus and the communication apparatus are performed, a state in which the communication partner apparatus transmits a signal after the initialization, security authentication, and key exchange of the communication partner apparatus have ended, or a state in which signal transmission to and from the communication partner apparatus is stopped.

(3) The communication apparatus according to (1), in which
  the signal transmission state includes at least a state in which power activation of at least one of the communication partner apparatus or the communication apparatus or reset of at least one of the communication partner apparatus or the communication apparatus is performed, a state in which initialization, security authentication, and key exchange of the communication partner apparatus are performed, a state in which a signal is transmitted to the communication partner apparatus after initialization, security authentication, and key exchange of the communication partner apparatus have ended, and a state in which signal transmission to and from the communication partner apparatus is stopped.

(4) The communication apparatus according to any one of (1) to (3), in which
  the communication unit performs signal transmission in the first direction and signal transmission in the second direction in a switching manner in units of predetermined fixed period by time-dividing the fixed period.

(5) The communication apparatus according to (4), in which
  the communication control unit adjusts the signal ratios in the first direction and the second direction for each of the fixed periods.

(6) The communication apparatus according to (4) or (5), in which
 the communication control unit selects one of a plurality of signal ratio patterns representing the type of signal ratios in the first direction and the second direction in accordance with the signal transmission state, and
 the communication unit performs signal transmission in the first direction and the second direction in a switching manner by time division on the basis of the signal ratio pattern selected by the communication control unit.

(7) The communication apparatus according to (6), further includes
 a storage unit that stores the plurality of signal ratio patterns, in which
 in accordance with the signal transmission state, the communication control unit selects one of the plurality of signal ratio patterns stored in the storage unit, and
 the communication unit transmits a signal indicating the signal ratio pattern selected by the communication control unit to the communication partner apparatus.

(8) The communication apparatus according to (6) or (7), in which
 the communication unit transmits and receives a signal having a predetermined frame structure, and
 the frame structure includes information indicating whether or not to permit change of a count value defining timing of changing the signal ratios in the second direction and the first direction, information indicating the count value, the signal ratio pattern being selected, the signal ratio pattern to be selected next, and information indicating whether or not to permit change of a signal ratio.

(9) The communication apparatus according to (8), in which
 the frame structure is included in an operation administration and maintenance (OAM).

(10) The communication apparatus according to any one of (4) to (9), in which
 in a case of changing the signal ratios in the first direction and the second direction, the communication control unit changes the signal ratios in the first direction and the second direction after a period n times (n is an integer equal to or greater than 2) as long as the fixed period has elapsed.

(11) The communication apparatus according to (10), in which
 the communication control unit changes the signal ratios in the first direction and the second direction in a case where a response indicating that change of a signal ratio pattern is accepted is received from the communication partner apparatus within the period n times as long as the fixed period.

(12) The communication apparatus according to (4) or (5), in which
 the communication unit transmits and receives a signal having a frame structure including one or more containers storing the transmitted and received signal for each of the fixed periods, and
 the communication control unit adjusts the number of the containers in accordance with the signal transmission state.

(13) The communication apparatus according to (12), in which
 the frame structure includes a synchronization signal, at least one of the containers transmitted and received within the fixed period, and a parity signal.

(14) The communication apparatus according to any one of (4) to (13), in which
 the communication control unit makes the signal ratio in the first direction and the signal ratio in the second direction 1:1 in at least one of when the communication apparatus and the communication partner apparatus perform security authentication and key exchange, when the communication apparatus performs initialization, and when the communication partner apparatus performs initialization.

(15) The communication apparatus according to any one of (1) to (14), in which
 the signal ratio is a ratio of a signal amount or a usage ratio of a signal.

(16) The communication apparatus according to any one of (1) to (15), in which
 the communication unit is capable of transmitting a captured video signal, and
 the communication control unit makes the signal ratio in the second direction within a period of receiving a video signal from the communication partner apparatus higher than the signal ratio in the first direction.

(17) The communication apparatus according to (16), in which
 the communication unit receives a video signal transmitted from the communication partner apparatus in units of video frame, and
 the communication control unit makes the signal ratio in the second direction within a period of receiving a video signal in one video frame higher than the signal ratio in the second direction within a vertical blanking period after receiving a video signal in one video frame.

(18) The communication apparatus according to (16), in which
 the communication unit transmits a video signal to the communication partner apparatus in units of video frame, and
 the communication control unit stops signal transmission in the first direction and the second direction within a vertical blanking period after transmitting a video signal in one video frame.

(19) The communication apparatus according to any one of (1) to (18), in which
 the communication unit is capable of transmitting a video signal to be displayed on a display unit of the communication partner apparatus or to be processed by a processing unit of the communication partner apparatus, and
 the communication control unit makes the signal ratio in the second direction within a period of transmitting a video signal to the communication partner apparatus higher than the signal ratio in the first direction.

(20) The communication apparatus according to any one of (1) to (19), in which
 the communication partner apparatus is a slave apparatus that performs signal transmission to and from the communication unit on the basis of an instruction from the communication control unit.

(21) The communication apparatus according to any one of (1) to (19), in which
 the communication partner apparatus is a master apparatus that performs signal transmission to and from the communication unit on the basis of an instruction from the communication control unit.

(22) A communication system includes:
a master apparatus; and
a slave apparatus that performs signal transmission to and from the master apparatus in accordance with an instruction from the master apparatus, in which the master apparatus and the slave apparatus change a signal ratio in a first direction from the master apparatus to the slave apparatus and a signal ratio in a second direction from the slave apparatus to the master apparatus in accordance with a signal transmission state between the master apparatus and the slave apparatus.

(23) A communication method includes performing signal transmission between the master apparatus and the slave apparatus in accordance with an instruction from the master apparatus, in which the master apparatus and the slave apparatus change a signal ratio in a first direction from the master apparatus to the slave apparatus and a signal ratio in a second direction from the slave apparatus to the master apparatus in accordance with a signal transmission state between the master apparatus and the slave apparatus.

At least a part of the communication apparatus and the communication system described in the above embodiments may be configured with hardware or may be configured with software. In a case of configuring with software, a program implementing at least a part of functions of the communication apparatus and the communication system may be stored in a recording medium such as a flexible disk or a CD-ROM and read by a computer for execution. The recording medium is not limited to a removable one such as a magnetic disk and an optical disk, and may be a fixed type recording medium such as a hard disk device or a memory.

In addition, a program implementing at least a part of functions of the communication apparatus and the communication system may be distributed via a communication line (including wireless communication) such as the Internet. Furthermore, the program may be distributed in an encrypted, modulated, or compressed state via a wired or wireless line such as the Internet, or being stored in a recording medium.

The aspect of the present disclosure is not limited to the individual embodiments described above, and includes various modifications that can be conceived of by those skilled in the art, and the effects of the present disclosure are not limited to those described above.

That is, various additions, modifications, and partial deletions are possible in a scope without departing from the conceptual idea and spirit of the present disclosure as derived from the contents defined in the claims and their equivalents.

REFERENCE SIGNS LIST 1a, 1b Communication apparatus
2 Communication system
3 Master apparatus
4 Slave apparatus
6 Host unit
7 Master SerDes unit
8 First MUX unit
9 First reception unit
10 First transmission unit
11 First LINK unit
11a Storage unit
12 Sensor
13 Slave SerDes unit
14 Second MUX unit
15 Second reception unit
16 Second transmission unit
17 Second LINK unit
17a Storage unit

The invention claimed is:

1. A communication apparatus, comprising:
a communication circuitry configured to perform signal transmission to and from a communication partner apparatus; and
a controller configured to change signal ratios, each signal ratio being a ratio of signals transmitted in a first direction to the communication partner apparatus to signals received in a second direction from the communication partner apparatus, the change of each said signal ratio being made in accordance with a signal transmission state with the communication partner apparatus, wherein
the controller adjusts the signal ratios in the first direction and the second direction for each of a plurality of predetermined fixed periods, and
the signal transmission state includes a state in which signal transmission to and from the communication partner apparatus is stopped.

2. The communication apparatus according to claim 1, wherein
the signal transmission state includes at least one of a state in which initialization, security authentication, and key exchange of the communication partner apparatus are performed, or a state in which the communication partner apparatus transmits a signal after the initialization, security authentication, and key exchange of the communication partner apparatus have ended.

3. The communication apparatus according to claim 1, wherein
the signal transmission state includes at least a state in which power activation of at least one of the communication partner apparatus or the communication apparatus or reset of at least one of the communication partner apparatus or the communication apparatus is performed, a state in which initialization, security authentication, and key exchange of the communication partner apparatus are performed, a state in which a signal is transmitted to the communication partner apparatus after initialization, security authentication, and key exchange of the communication partner apparatus have ended, and a state in which signal transmission to and from the communication partner apparatus is stopped.

4. The communication apparatus according to claim 1, wherein the communication circuitry is configured to perform signal transmission in the first direction and signal transmission in the second direction in a switching manner in each of the predetermined fixed periods by time-dividing into the predetermined fixed periods.

5. The communication apparatus according to claim 4, wherein the controller is configured to adjust signal ratios in the first direction and the second direction for each of the plurality of predetermined fixed periods.

6. The communication apparatus according to claim 4, wherein
the controller is configured to select one of a plurality of signal ratio patterns representing a type of signal ratios in the first direction and the second direction in accordance with the signal transmission state, and
the communication circuitry is configured to perform signal transmission in the first direction and the second direction in a switching manner by time division on a basis of the signal ratio pattern selected by the controller.

7. The communication apparatus according to claim 6, further comprising:
a memory that stores the plurality of signal ratio patterns, wherein
in accordance with the signal transmission state, the controller selects one of the plurality of signal ratio patterns stored in the memory, and
the communication circuitry transmits a signal indicating the signal ratio pattern selected by the controller to the communication partner apparatus.

8. The communication apparatus according to claim 6, wherein the communication circuitry transmits and receives a signal having a predetermined frame structure, and
the frame structure includes information indicating whether or not to permit change of a count value defining timing of changing signal ratios in the second direction and the first direction, information indicating the count value, the signal ratio pattern being selected, the signal ratio pattern to be selected next, and information indicating whether or not to permit change of a signal ratio.

9. The communication apparatus according to claim 8, wherein the frame structure is included in an operation administration and maintenance (OAM).

10. The communication apparatus according to claim 4, wherein
in a case of changing the signal ratios in the first direction and the second direction, the controller changes the signal ratios in the first direction and the second direction after a period n times (n is an integer equal to or greater than 2) as long as the fixed period has elapsed.

11. The communication apparatus according to claim 10, wherein
the controller changes the signal ratios in the first direction and the second direction in a case where a response indicating that change of a signal ratio pattern is accepted is received from the communication partner apparatus within the period n times as long as the fixed period.

12. The communication apparatus according to claim 4, wherein
the communication circuitry transmits and receives a signal having a frame structure including one or more containers storing a transmitted and received signal for each of the fixed periods, and
the controller adjusts a number of the containers in accordance with the signal transmission state.

13. The communication apparatus according to claim 12, wherein the frame structure includes a synchronization signal, at least one of the containers transmitted and received within the fixed period, and a parity signal.

14. The communication apparatus according to claim 4, wherein
the controller makes the signal ratio in the first direction and the signal ratio in the second direction 1:1 in at least one of when the communication apparatus and the communication partner apparatus perform security authentication and key exchange, when the communication apparatus performs initialization, or when the communication partner apparatus performs initialization.

15. The communication apparatus according to claim 1, wherein the signal ratio is a ratio of a signal amount or a usage ratio of a signal.

16. The communication apparatus according to claim 1, wherein
the communication circuitry is configured to transmit a captured video signal, and
the controller makes the signal ratio in the second direction within a period of receiving a video signal from the communication partner apparatus higher than the signal ratio in the first direction.

17. The communication apparatus according to claim 16, wherein
the communication circuitry receives a video signal transmitted from the communication partner apparatus in units of video frame, and
the controller makes the signal ratio in the second direction within a period of receiving a video signal in one video frame higher than the signal ratio in the second direction within a vertical blanking period after receiving a video signal in one video frame.

18. The communication apparatus according to claim 16, wherein
the communication circuitry transmits a video signal to the communication partner apparatus in units of video frame, and
the controller stops signal transmission in the first direction and the second direction within a vertical blanking period after transmitting a video signal in one video frame.

19. The communication apparatus according to claim 1, wherein
the communication circuitry is configured to transmit a video signal to be displayed on a display of the communication partner apparatus or to be processed by a processor of the communication partner apparatus, and
the controller makes the signal ratio in the second direction within a period of transmitting a video signal to the communication partner apparatus higher than the signal ratio in the first direction.

20. The communication apparatus according to claim 1, wherein the communication partner apparatus is a slave apparatus that performs signal transmission to and from the communication circuitry on a basis of an instruction from the controller.

21. The communication apparatus according to claim 1, wherein the communication partner apparatus is a master apparatus that performs signal transmission to and from the communication circuitry on a basis of an instruction from the controller.

22. A communication system, comprising:
a master apparatus; and
a slave apparatus configured to perform signal transmission to and from the master apparatus in accordance with an instruction from the master apparatus, wherein
the master apparatus and the slave apparatus are configured to change signal ratios, each signal ratio being a ratio of signals transmitted in a first direction from the master apparatus to the slave apparatus to signals received in a second direction from the slave apparatus by the master apparatus, the change of the signal ratio being made in accordance with a signal transmission state between the master apparatus and the slave apparatus, wherein
the master apparatus adjusts the signal ratios in the first direction and the second direction for each of a plurality of predetermined fixed periods, and
the signal transmission state includes a state in which signal transmission to and from the slave apparatus is stopped.

23. A communication method, comprising:
- performing signal transmission between a master apparatus and a slave apparatus in accordance with an instruction from the master apparatus; and
- changing, by the master apparatus and the slave apparatus, signal ratios, each signal ratio being a ratio of signals transmitted in a first direction from the master apparatus to the slave apparatus to signals received in a second direction from the slave apparatus by the master apparatus, the change of the signal ratio being made in accordance with a signal transmission state between the master apparatus and the slave apparatus, wherein
- the master apparatus adjusts the signal ratios in the first direction and the second direction for each of a plurality of predetermined fixed periods, and
- the signal transmission state includes a state in which signal transmission to and from the slave apparatus is stopped.

* * * * *